United States Patent
Jones

(10) Patent No.: US 6,910,788 B2
(45) Date of Patent: Jun. 28, 2005

(54) LED VEHICLE WHEEL WELL ILLUMINATION DEVICE

(76) Inventor: Bo T. Jones, Rte. 1, Box 81, Carrollton, MS (US) 38917

( * ) Notice: Subject to any disclaimer, the term of this patent is extended or adjusted under 35 U.S.C. 154(b) by 98 days.

(21) Appl. No.: 10/602,067

(22) Filed: Jun. 24, 2003

(65) Prior Publication Data

US 2004/0264207 A1 Dec. 30, 2004

(51) Int. Cl.$^7$ .............................................. F21V 33/00
(52) U.S. Cl. ........................ 362/506; 362/545; 362/240
(58) Field of Search ................................. 362/500, 506, 362/545, 240, 459, 464, 487, 227, 540–548, 235–238, 241, 244–250, 257, 296, 297, 362, 307–311, 368, 370, 365; 293/1, 21, 24; 296/1.04, 1.07, 1.08, 1.11

(56) References Cited

U.S. PATENT DOCUMENTS

| | | | |
|---|---|---|---|
| 1,145,087 A | | 7/1915 | Shaw |
| 1,496,140 A | | 6/1924 | Tuttle |
| 2,325,403 A | | 7/1943 | Illiano ........................ 240/8.1 |
| 2,786,935 A | | 3/1957 | Geary ......................... 240/8.1 |
| 3,017,500 A | | 1/1962 | Pezzopane .................. 240/8.2 |
| 4,802,069 A | * | 1/1989 | Chandler .................... 362/506 |
| 5,040,100 A | * | 8/1991 | Di Gaetano ................ 362/506 |
| 5,062,027 A | * | 10/1991 | Machida et al. ............ 362/545 |
| 5,099,401 A | * | 3/1992 | Kondo et al. ............... 362/545 |
| 5,373,280 A | * | 12/1994 | Louy et al. .................. 362/545 |
| 5,465,194 A | | 11/1995 | Currie ......................... 362/32 |
| 5,490,049 A | * | 2/1996 | Montalan et al. ........... 362/545 |
| 5,530,630 A | | 6/1996 | Williams, Jr. ................ 362/78 |
| 5,548,274 A | | 8/1996 | Anderson et al. ........... 340/468 |
| 5,558,426 A | | 9/1996 | Cabanatan et al. ........... 362/78 |
| 5,573,686 A | * | 11/1996 | Lavicska .................... 362/506 |
| 5,700,080 A | * | 12/1997 | Okuda ........................ 362/545 |
| 6,015,223 A | * | 1/2000 | Kidd et al. .................. 362/545 |
| 6,149,288 A | * | 11/2000 | Huang ........................ 362/545 |
| 6,276,822 B1 | * | 8/2001 | Bedrosian et al. .......... 362/545 |
| 6,367,950 B1 | * | 4/2002 | Yamada et al. ............. 362/545 |
| 6,422,725 B1 | * | 7/2002 | Fong .......................... 362/500 |
| 6,461,028 B1 | * | 10/2002 | Huang ........................ 362/545 |
| 6,505,963 B1 | * | 1/2003 | Chiang ....................... 362/545 |
| 6,685,349 B2 | * | 2/2004 | Schmidt et al. ............. 362/506 |
| 6,817,743 B2 | * | 11/2004 | Sharper ...................... 362/500 |

* cited by examiner

Primary Examiner—John Anthony Ward
Assistant Examiner—Ismael Negron
(74) Attorney, Agent, or Firm—Richard C. Litman

(57) ABSTRACT

A wheel light device for a vehicle with an electrical battery, wheels, fenders and wheel wells that shines light onto and in front of one of each of the wheels of the vehicle. The device includes LED bulbs in a casing and a reflector that attaches to the bulbs to direct light onto the wheels of a vehicle. A waterseal canal, for draining any water and condensation that may accumulate within the wheel light device, and a waterproofing gasket, for sealing the device from any water reaching its components, protect the device from water. There are several different embodiments of the invention including an outer fender flare mounted embodiment with multiple LED bulbs, an inner fender mounted embodiment with multiple LED bulbs, provisions to address arched wheel wells or horizontally straight wheel wells, various safety light provisions in addition to additional supplemental features.

15 Claims, 9 Drawing Sheets

LED VEHICLE WHEEL WELL ILLUMINATION DEVICE

BACKGROUND OF THE INVENTION

1. Field of the Invention

The present invention relates to a variety of vehicle lighting systems, and particularly to wheel light devices for lighting the wheels of a variety of vehicles such as cars, trucks, vans, SUVs, emergency vehicles and motorcycles.

2. Description of the Related Art

Vehicle novelties have been in existence for as long as there have been vehicles. Many functional and non-functional vehicle novelties have been developed and continue to be developed to satisfy the tastes of those in the marketplace. These novelties include lights that can illuminate the wheels of a vehicle, a novelty that is known and reflected in the related art.

U.S. Pat. No. 1,145,087 issued to Shaw, outlines the use of a novel, simple, effective and inexpensive illuminating device with an electric lamp, which is disposed in the forward end of each of the fenders of a vehicle. The device utilizes one or more jewels or lenses for projecting either white or colored lights directly ahead and substantially in line with the extreme lateral limits of the vehicle.

U.S. Pat. No. 1,496,140 issued to Tuttle, outlines the use of lamps of the type, which are positioned upon the fender or mudguard of a vehicle. The lamp will direct rays somewhat forwardly and to the side of the vehicle, for the purpose of clearly illuminating the road to the side of the vehicle.

U.S. Pat. No. 2,325,403 issued to Illiano, outlines the use of an emergency tire lighting apparatus, adapted to be attached to the fenders of a motor vehicle, above the wheel for facilitating the changing of tires or applying chains to tires at night. There is also a socket provided for selectively receiving the plug of a safety or trouble light extension cord, for use to warn approaching cars that repairs are being made or for general illumination purposes to facilitate repairs.

U.S. Pat. No. 2,786,935 issued to Geary, outlines the use of an attachment for automotive vehicles, and more particularly, an illuminating means adapted to be mounted so as to direct rays of light outwardly and downwardly from the interior of the fenders of a vehicle. These under fender lights are completely sealed from mud, water and other road debris by a suitable shell and cover, which are adapted to overlie a glass globe. The fender lights are capable of being actuated so as to permit light rays to be directed, so as to give efficient light for tire changes, putting on chains and checking springs, while also providing for clearance for protection.

U.S. Pat. No. 3,017,500 issued to Pezzopane, outlines the use of trouble lights used in combination with the wheels of motor vehicles, and in particular, light casings mounted in openings in vertically disposed side walls of a motor vehicle. The trouble lights are positioned directly above the wheels of the vehicle, whereby rays of light, from light bulbs in the casings, are directed downwardly and outwardly through elongated openings in the lower sides of the casings. The trouble lights illuminate the outer surfaces of the wheels, to facilitate removing and replacing tires or wheels of the vehicle.

U.S. Pat. No. 4,802,069 issued to Chandler, outlines the use of a set of tire change lights for illuminating the tires of an automotive vehicle during a tire-changing operation. The set of tires change lights are made up of four lights, each of which are mounted near the wheel well above each of the vehicle's tires. Each light includes a light source, such as a light bulb, which is mounted inside a lamp housing. The lamp housing, in turn, is mounted for manual or automatic reciprocation from a retracted position, within a concealed stationary mounting case in the body of the vehicle, to an extended position outside of the vehicle.

U.S. Pat. No. 5,040,100 issued to DiGaetano, outlines the use of a vehicle wheel well illumination device, made up of a pair of light sources and a resilient rod interconnecting the light sources in a spaced apart configuration. The resilient rod is capable of elastic deformation under a manual bending effort, to bring the rod in a condition suitable to enter a wheel well of a vehicle. Discontinuance of the bending effort causes the rod to partially recover its original form, frictionally engaging the wheel well and retaining it in place.

U.S. Pat. No. 5,465,194 issued to Currie, outlines the use of an optical fiber illumination device, which includes at least one optical fiber cable and one or more light sources for introducing light into the optical fiber cable. There is also a lens through which light from each light source passes prior to entering the optical fiber cable for producing a colored light. There is electrical circuitry for energizing the light source, and a housing for containing the circuitry and the light source.

U.S. Pat. No. 5,530,630 issued to Williams, Jr., outlines the use of an apparatus for lighting a wheel rotatably mounted on the frame of a vehicle, and includes a source of current mounted on the frame of the vehicle. There is also a commutator mounted to the wheel for rotation therewith, and a brush electrically connected to the source of current and mounted to the frame adjacent the commutator. The brush has a contact portion for contacting the commutator to provide a flow of current from the battery to the commutator so as to power the light bulb.

U.S. Pat. No. 5,548,274 issued to Anderson et al., outlines the use of a lighting device and method that makes the wheel well areas of a vehicle available for displaying messages and graphical indicia. The lighting device also allows the wheel well to be illuminated during normal and emergency repairs when insufficient light is available. The lighting device further enhances the appearance of the vehicle and will attract the attention of others. The lighting device can have a sensor to monitor the rotation of the tire and also has a pulse modulator to synchronize light flashes from a flash generator, with information on a sidewall of the tire.

U.S. Pat. No. 5,558,426 issued to Cabanatan et al., outlines the use of a set of automotive wheel lights for illuminating the wheels of an automobile in operation at night. The automotive wheel lights include a plurality of lights, one for each wheel, which are each mounted on the frame of the automobile near a respective wheel. Each light includes a light bulb in a socket, held fixed at its lighting position at the lighting end of a rigid arm, bent towards the wheel of the automobile and mounted onto and extending from the automobile. The light bulb is encased in a protective light bulb cover and lens, which directs illumination onto the entire outside surface of the wheel.

Although each of these patents outline effective and useful wheel light devices, the use of the wheel light devices can be improved by providing a variety of lighted wheel devices that can accommodate the differing wheel wells of many different vehicles. Such devices would be in great demand in the marketplace.

None of the above inventions and patents, taken either singularly or in combination, is seen to describe the instant invention as claimed. Thus a wheel light device solving the aforementioned problems is desired.

SUMMARY OF THE INVENTION

The invention is a wheel light device for a vehicle with an electrical battery, wheels and fenders that shine light onto and in front of one of each of the wheels of the vehicle. There are several different embodiments of the invention that include an inner fender mounted embodiment with multiple LED bulbs, and a fender flare shaped embodiment with multiple LED bulbs, provisions to address arched wheel wells or horizontally straight wheel wells, various safety light provisions in addition to some supplemental features.

Accordingly, it is a principal object of the invention to provide a wheel light device for vehicles with a variety of wheel well types.

It is another object of the invention to provide a wheel light device that is configured for easy attachment to the fender above the wheel of a vehicle.

It is a further object of the invention to provide a wheel light device that is easy to install.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
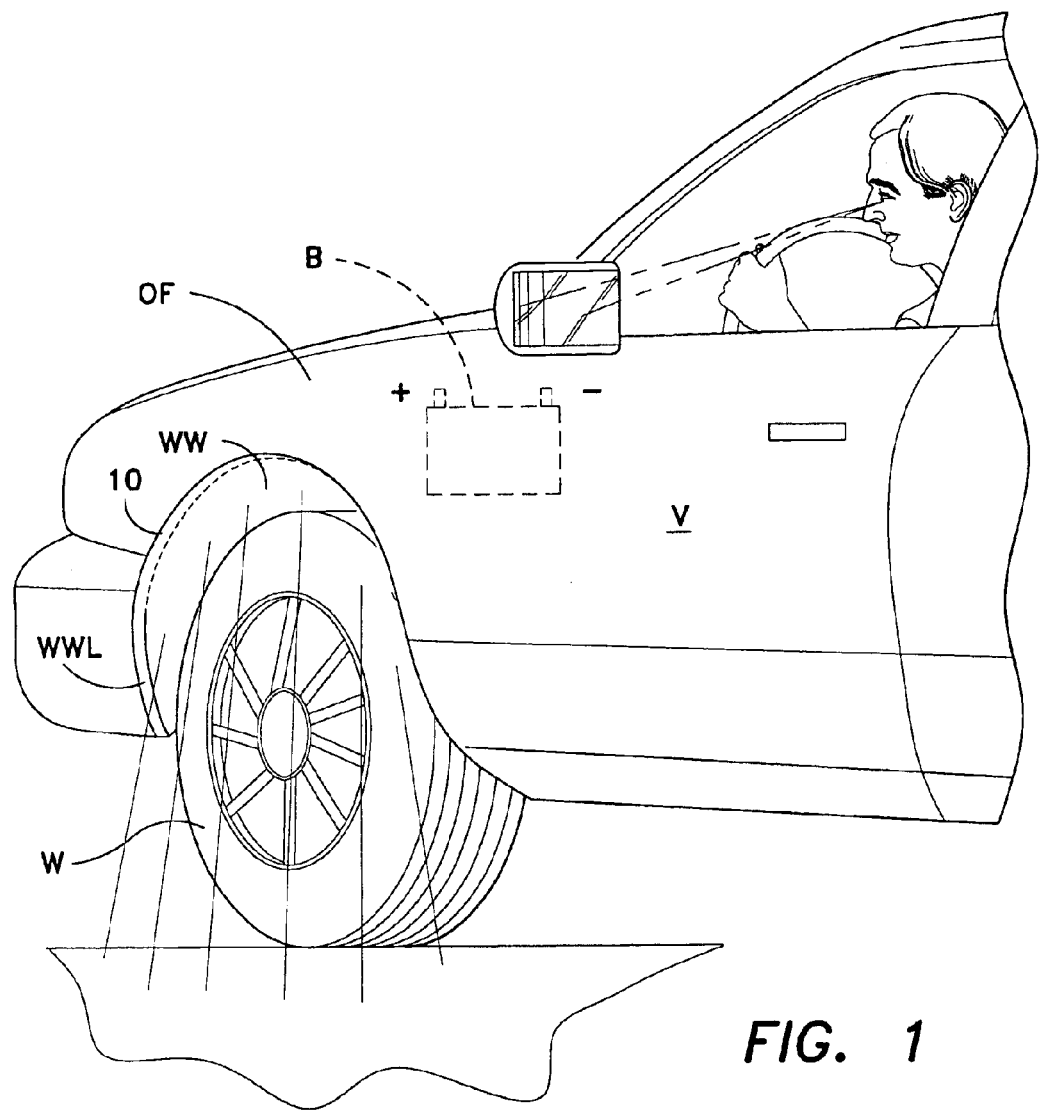
FIG. 1 is an environmental perspective view of a first embodiment of an inner fender mounted multiple LED bulb wheel light device according to the present invention.

The present invention is a wheel light device 10 for a vehicle V, with an electrical battery B, wheels W, fenders F, wheel wells WW and a wheel well lip WWL that shines light onto and in front of one of the wheels W of the vehicle V. The first embodiment of the wheel light device 10 is depicted in FIG. 1. The second embodiment of the wheel light device 140 with an outer fender flare is depicted in FIG. 2.

As shown in FIG. 1, the inner fender mounted wheel light device 10 is not visible from the outside of its fender F. This wheel light device 10 is adhered to the inside of the vehicle's fender IF (FIG. 3) above the vehicle's V wheels W and is hidden from this view by the outside of the vehicle's fender OF.

Figure 2:
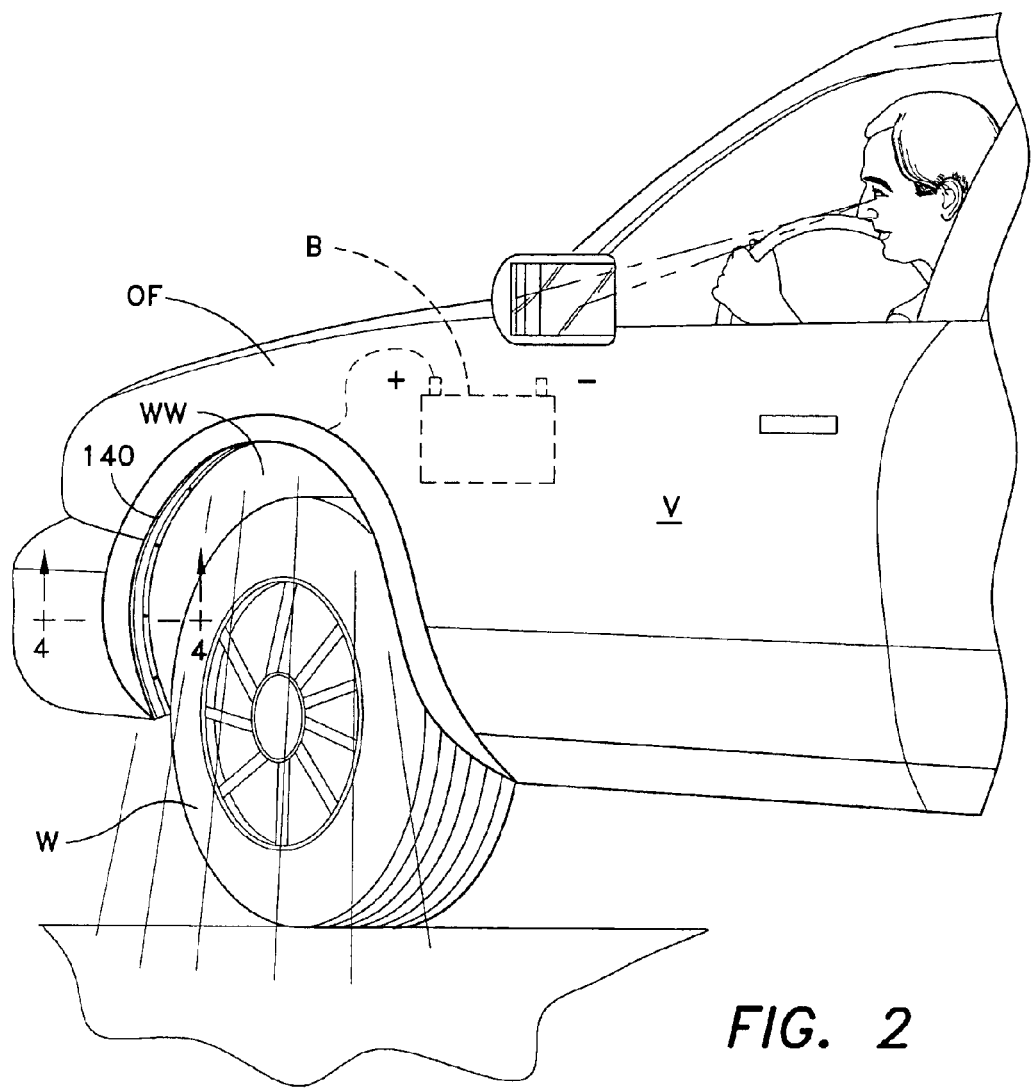
FIG. 2 is an environmental perspective view of a second embodiment of an outer fender mounted multiple LED bulb wheel light device.
Figure 4:
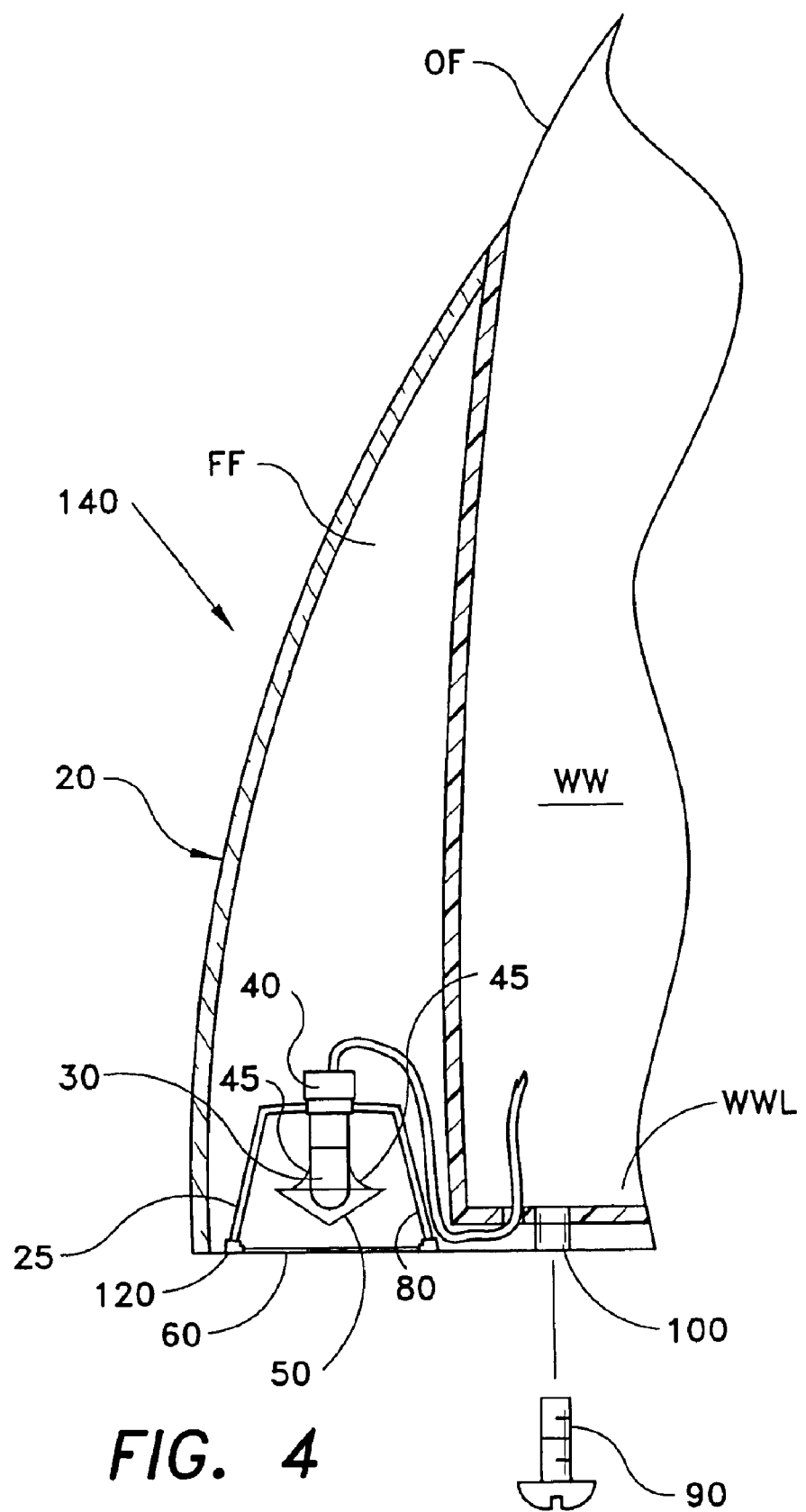
FIG. 4 is a cross-sectional perspective view along line 4—4 of FIG. 2 of an outer fender mounted multiple LED bulb wheel light device.

As shown in FIG. 2, the outer fender mounted wheel light device 140 is noticeably visible from the outside of the fender. The second embodiment of the wheel light device 140 is encased inside a fender flare FF (FIG. 4). The fender flare FF is made of thermoplastic, fiberglass or carbon fiber material and is formed and mounted to the outside of the vehicle's fender OF.

Figure 3:
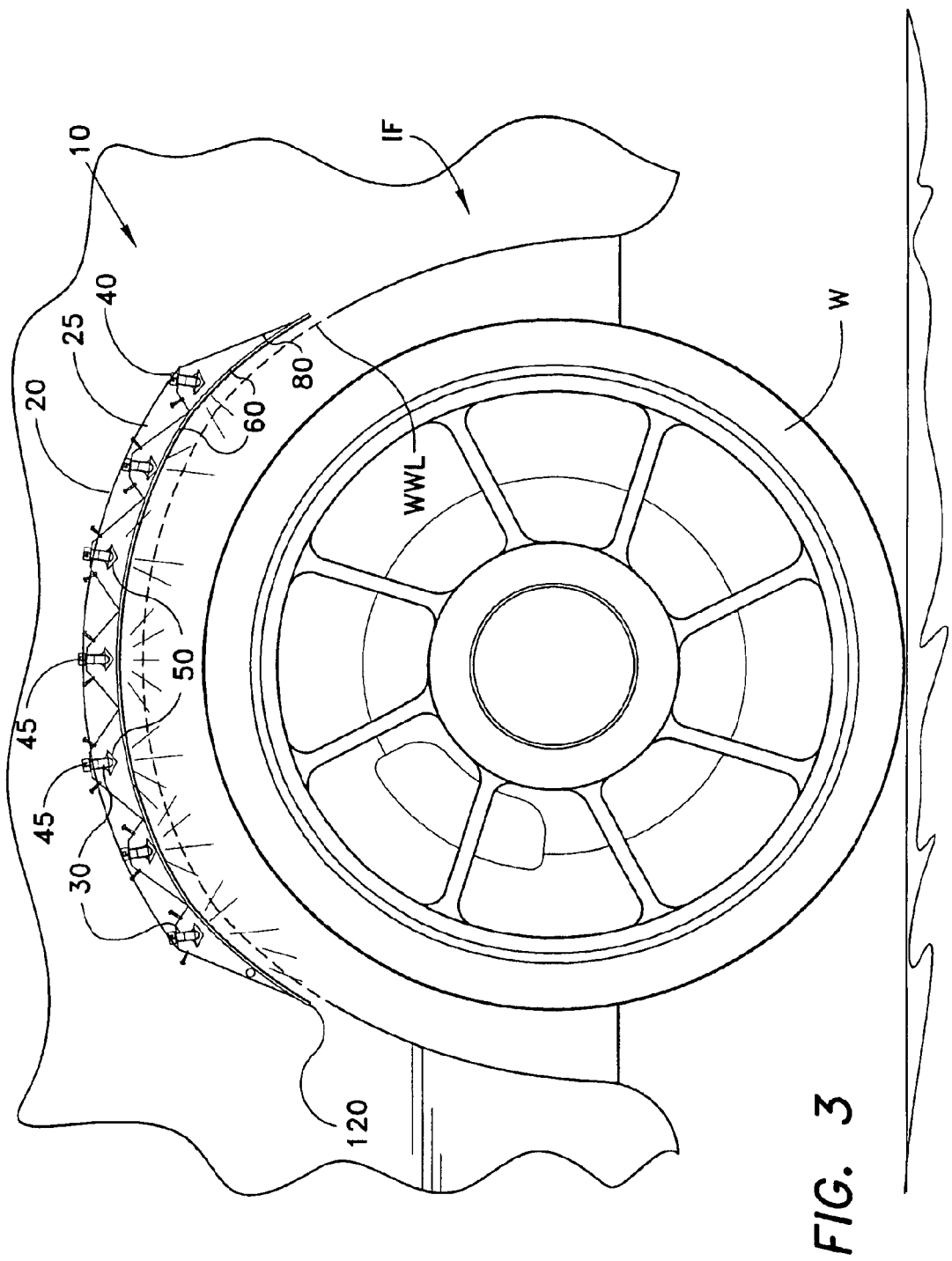
FIG. 3 is a side perspective view of an inner fender mounted multiple LED bulb wheel light device that accommodates a vehicle with a curved wheel well.

As shown in FIG. 3, the first embodiment of the wheel light device 10 comprises a body 20 with a generally thin casing 25, to hold the components of the wheel light device 10, a series of multiple LED bulbs 30, which are set within the casing 25, to provide light for the wheel light device 10, a quick connect socket 40 with two metal prongs 45 within the casing 25 for holding the LED bulbs 30, a first reflector 50 that attaches to the LED bulbs 30 to direct light from the LED bulbs 30 onto the wheels W, and a transparent and clear lens 60 to protect the components of the wheel light device 10. The wheel light device 10 further comprises a reflective fixture 80 to direct light from the LED bulb 30 downward through the transparent and clear lens 60 and towards the front of and onto one of the vehicle's V wheels W. There is also mounting adhesive to hold the wheel light device 10 to the inside of the vehicle's fender IF, which will adhere to both fiberglass and metal fender types. There is also a waterproofing gasket 120 between the clear and transparent lens 60 and the body 20 to seal and to protect the wheel light device 10 from any water reaching the components of the wheel light device 10, and a plurality of resistors (not shown) to provide a specific amount of resistance to the current flow of the wheel light device 10, with the battery B of the vehicle V providing power to the wheel light device 10. As is also depicted in FIG. 3, the first embodiment of the wheel light device 10 has a set of LED bulbs 30 in the body 20 that emits light that is dispersed through the entire width of the transparent and clear lens 60. Removal of the vehicle's wheel well lip WWL will be required to allow light emitted from the inner fender mounted wheel light device 10 to pass from the inside of the vehicle's fender IF down in front of and onto the vehicle's wheels W.

FIG. 4 illustrates the second embodiment of the outer fender wheel light device 140. This embodiment utilizes a plurality of LED bulbs 30 and the same reflector assembly as the first embodiment of the wheel light device 10. This embodiment utilizes a body 20 that accommodates a plurality of LED bulbs 30 and retains a generally thin casing 25 to illuminate a vehicle V and wheel W with an arched wheel well WW. A plurality of mounting screws 90 and a plurality of apertures 100 are provided to secure the second embodiment of the wheel light device 140 to the wheel well lip WWL of the vehicle V. Mounting adhesive (not shown) can also be used to attach the second embodiment of the wheel light device 140 to the outside of the vehicle's V metal or fiberglass fenders. Quick connect sockets 40, a removable, transparent and clear lens 60, a first reflector 50 and a reflective fixture 80, are also provided with this second embodiment of the wheel light device 140.

Figure 5:
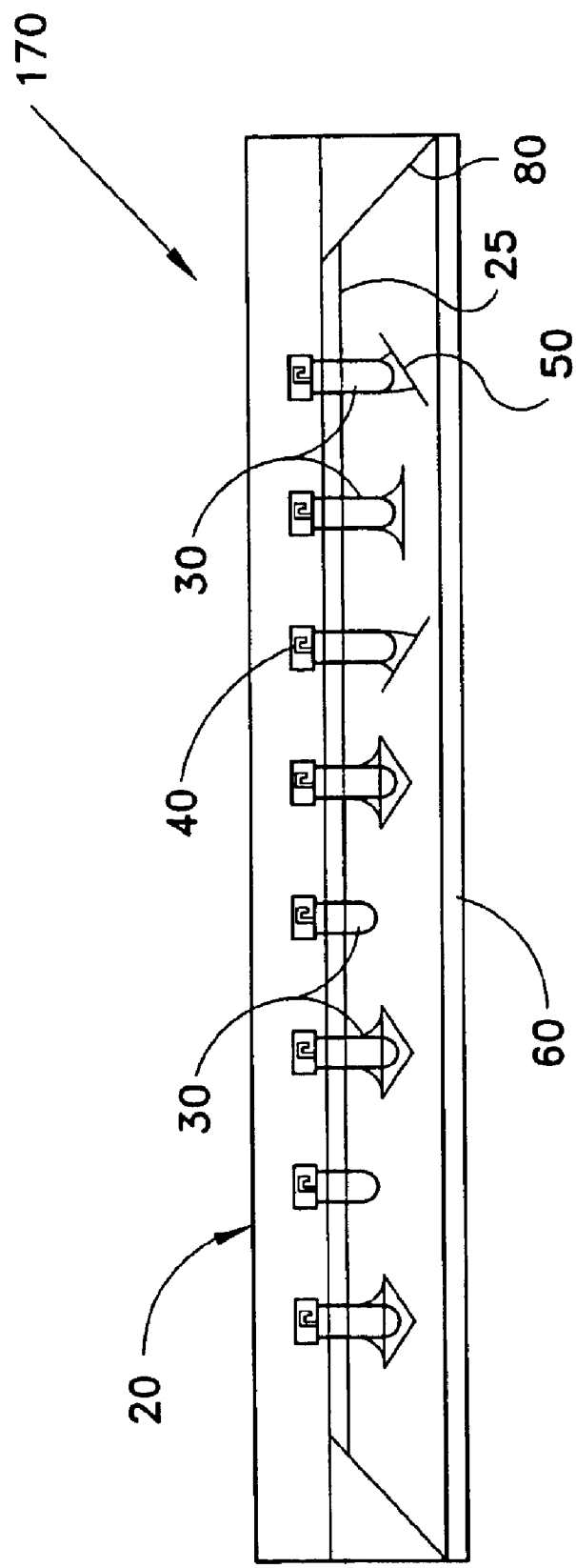
FIG. 5 is a side perspective view of an inner fender mounted multiple LED bulb wheel light device that accommodates a vehicle with a horizontally straight wheel well.

FIG. 5 depicts a third embodiment of the wheel light device 170, where the body 20 of the third embodiment of the wheel light device 170 is horizontally straight, to accommodate a horizontally straight wheel well WW of a vehicle V. The body 20, the generally thin casing 25, the LED bulbs 30, the quick connect sockets 40, the first reflectors 50 attached to the LED bulbs 30, the reflective fixture 80, and the transparent and clear lens 60 are similar to the first embodiment of the wheel light device 140, which is designed to accommodate vehicles V with arched wheel wells WW. A mounting adhesive to accommodate both metal and fiberglass fenders, is also provided to secure the third embodiment of the wheel light device 170 to the inside of the fender of a horizontally straight wheel well WW of a vehicle V. The body 20 and generally thin and flexible casing 25 of this embodiment, however, are not as flexible as the body 20 and generally thin casing 25 of the second embodiment of the wheel light device 140.

Figure 6:
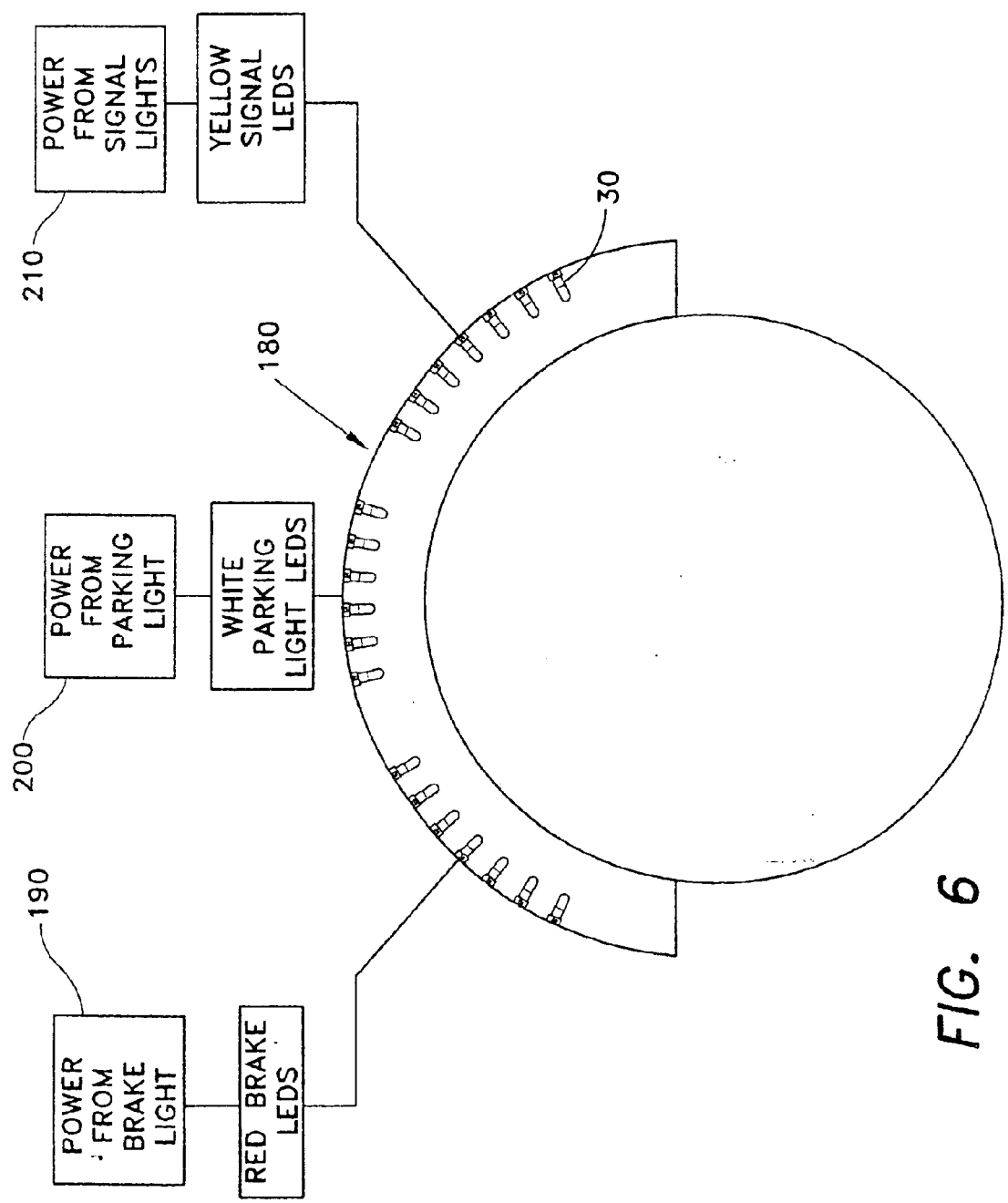
FIG. 6 is a side perspective view of a multiple LED bulb device that has colored lights that are tied into the vehicle's brake lights, parking lights and directional signal lights.

There is also a fourth embodiment of the wheel light device 180 that can be provided with LED bulbs 30, that can be activated by the vehicle's brake lights 190, parking lights 200 and signal lights 210, as are depicted in FIG. 6. The first set of the LED bulbs 30 are yellow and are activated by the signal lights 210 of the vehicle V. The second set of the LED bulbs 30 are white and are activated by the parking lights 200 of the vehicle V and the third set of the LED bulbs 30 are red and are activated by the brake lights 190. Each set of the LED bulbs 30 are provided on each of the wheel wells WW of the vehicle V and draw power from the battery B of the vehicle V. This embodiment of the wheel light device 180 is considered to be the safety wheel light embodiment and supplements the brake lights 190, parking lights 200 and signal lights 210 of the vehicle V. This embodiment can also be used in combination with the first embodiment of the wheel light device 10, the second embodiment of the wheel light device 140 or the third embodiment of the wheel light device 170.

Figure 7:
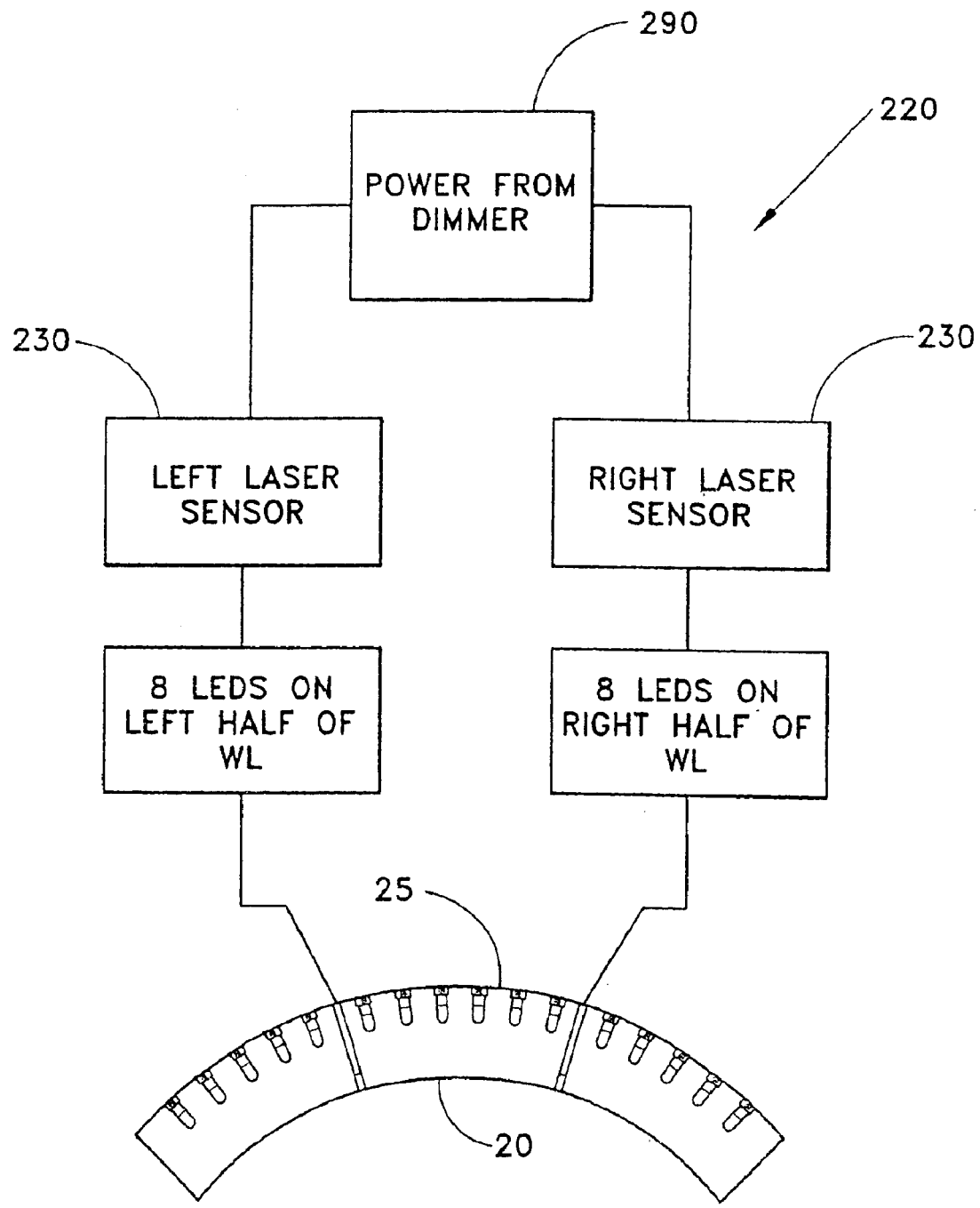
FIG. 7 is a side perspective view of a multiple LED bulb device that is provided with laser sensors.

There is a fifth embodiment of the wheel light device 220 where laser sensors 230 are provided to detect a vehicle's V wheel W within a specified distance from the wheel light device 220. This is illustrated on FIG. 7. The fifth embodiment of the wheel light device 220 has two laser sensors 230 provided, to detect one of the vehicle's V wheels W within 16 inches of the wheel light device 220. There is a laser sensor 230 on each side of this embodiment of the wheel light device 220 that is built into the body 20 and generally thin and flexible casing 25. These types of laser sensors 230 are known to those skilled in the related art and are powered by the vehicle's V battery B, like all of the components of this embodiment of the wheel light device 220. There should also be an equal number of LED bulbs 30 on each half of this embodiment of the wheel light device 220 (which in this case is 8 LED bulbs 30 on each half). This embodiment can also be used in combination with any of the previous embodiments of the wheel light device.

Figure 8:
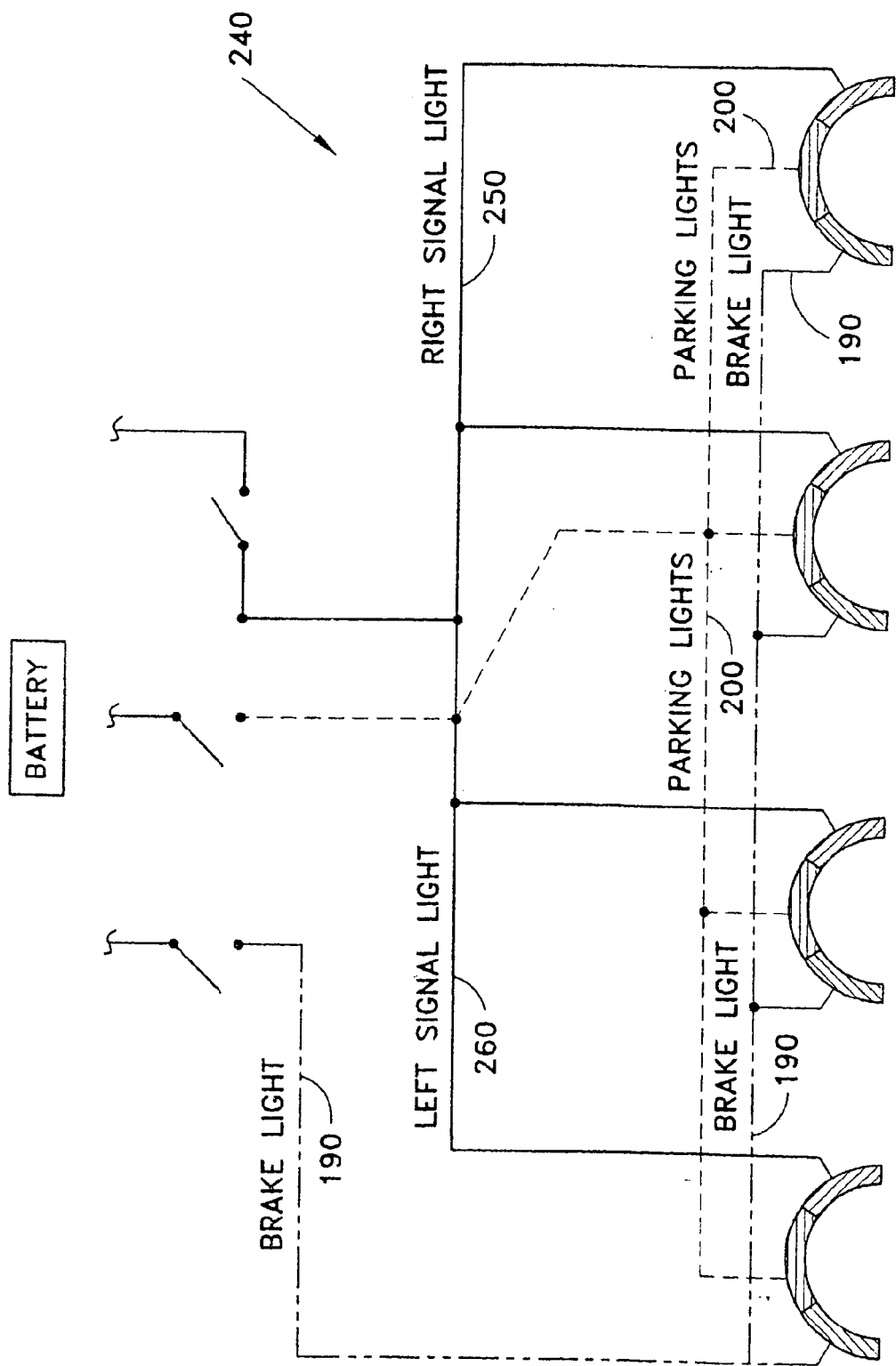
FIG. 8 is an electrical diagram of a multiple colored LED bulb device that corresponds to the signaling and positioning of the lights of each wheel well of a vehicle.

Additional safety features are provided in the sixth embodiment of the wheel light device 240 and are depicted on FIG. 8. In this embodiment of the wheel light device 240, the yellow LEDs in the wheel light device 240 on the right side of the vehicle V are activated by a right turn signal 250 and the yellow LEDs in the wheel light device 240 on the left side of the vehicle V are activated by a left turn signal 260. A second feature of this embodiment of the wheel light device 240 is to have all of the red LEDs in each individual wheel light device 240 activated by the use of a vehicle's V brake lights 190. A third feature of this embodiment of the wheel light device 240 is to have all of the white LEDs activated by the parking lights 200. Like all of the components, the sixth embodiment of the wheel light device 240 is powered by the vehicle's V battery B. This embodiment can also be used in combination with any of the previous embodiments of the wheel light device.

Figure 9:
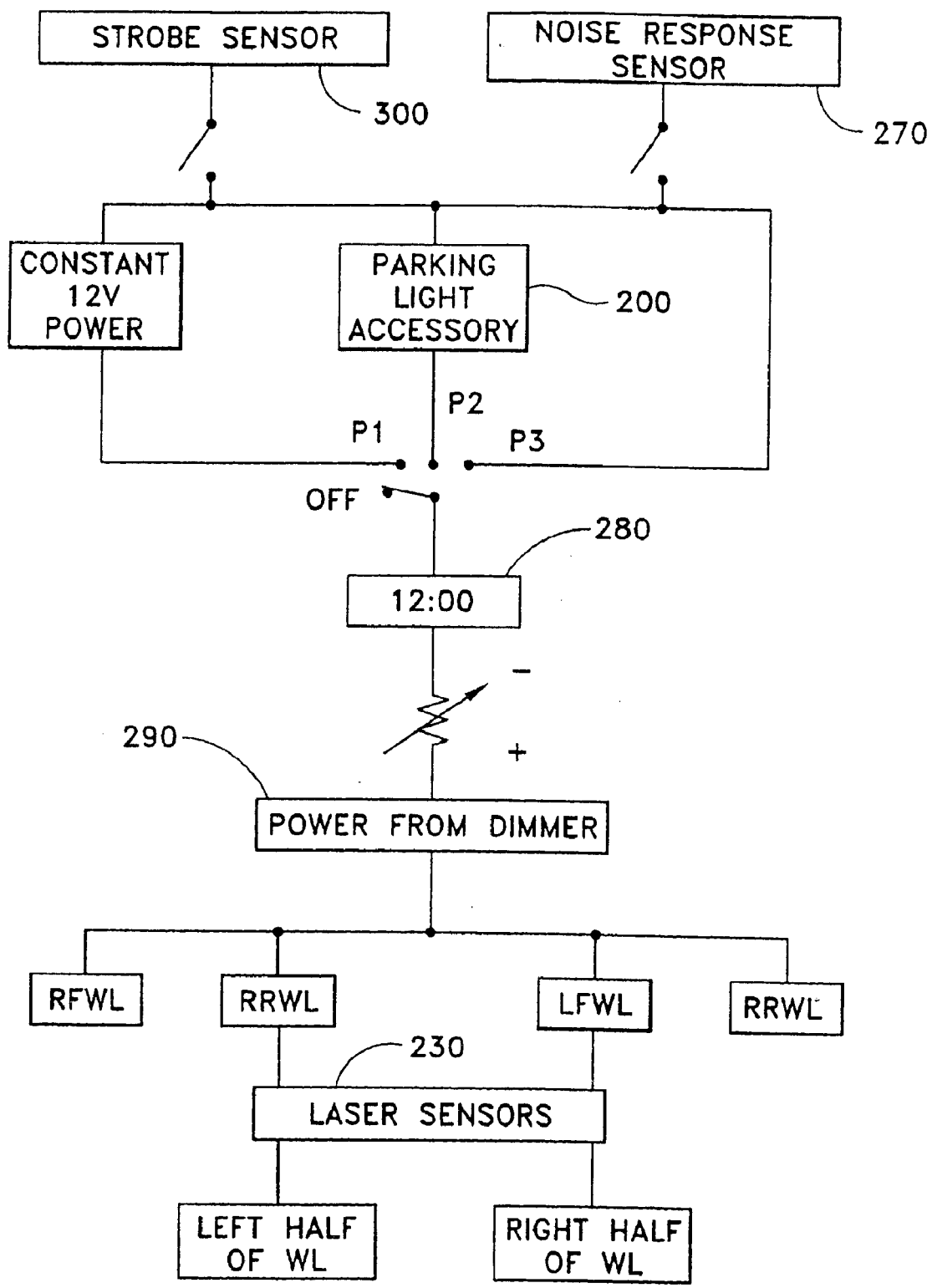
FIG. 9 is an electrical diagram of several supplemental features of the multiple LED bulb wheel light device.

There are also several additional features that are illustrated in FIG. 9. These features include a noise response sensor 270, an adjustable timer and delay cut-off 280, a dimmer switch 290 and a strobe light sensor 300. The noise response sensor 270 is a switch that is turned on and turned off by the operator. The noise response sensor 270 controls all power to the wheel lights. Once the noise response sensor 270 is activated, all lights will be powered with the same intensity of light. The louder the noise, the brighter the light. The adjustable timer and delay cut-off 280 selects the amount of time that the LED bulbs 30 will remain lit after power is turned off. The dimmer switch 290 allows a user to adjust the intensity of the light being given off by the LED bulbs 30 in gradual and varying degrees, while a strobe light sensor 300 activates the LED bulbs 30 to flicker and emit a strobe light. These auxiliary features can be provided on any previous embodiment of the wheel light device and are well-known components that can be easily added to the electrical system of a vehicle V.

It is to be understood that the present invention is not limited to the embodiments described above, but encompasses any and all embodiments within the scope of the following claims.

I claim:

1. A wheel light device for a vehicle with a right side and a left side, with an electrical battery, fenders, wheels with a front side, and wheel wells, that shines light onto and in front of one of the wheels of the vehicle, comprising:

a body with a generally thin casing to hold components of the wheel light device;

LED bulbs set within the generally thin casing, to provide light for the wheel light device;

a plurality of quick connect sockets with metal prongs within the generally thin casing for holding the LED bulbs;

a reflector that attaches to the LED bulbs to direct light from the LED bulbs onto to the wheels of the vehicle;

a transparent and clear lens to protect the components of the wheel light device;

a reflective fixture to direct light from the LED bulbs downward through the transparent and clear lens and towards the front of and onto each of the vehicle's wheels;

a plurality of mounting screws and mounting adhesive, to hold the wheel light device to one of the wheel wells and one of the fenders of the vehicle;

a plurality of apertures to accommodate the plurality of mounting screws;

a waterseal canal to drain any water and condensation that may accumulate within the wheel light device;

a waterproofing gasket to seal and to protect the wheel light device from any water reaching the components of the wheel light device; and a plurality of resistors to provide a specific amount of resistance to current flow of the wheel light device, with the battery of the vehicle providing power to the wheel light device.

2. The wheel light device according to claim 1, wherein the wheel light device is mounted to the inside of the vehicle's fender above the wheels to illuminate one of the vehicle's wheels.

3. The wheel light device according to claim 1, wherein the wheel light device is inside of a fender flare casing and mounted to the outside of the vehicle's fender to illuminate one of the vehicle's wheels.

4. The wheel light device according to claim 1, wherein the body of the wheel light device is arched to accommodate an arched wheel well of the vehicle.

5. The wheel light device according to claim 1, wherein the body of the wheel light device is horizontally straight to accommodate a horizontally straight wheel well of the vehicle.

6. The wheel light device according to claim 1, further comprising different colored LED bulbs activated by the vehicle's brake lights, parking lights and signal lights.

7. The wheel light device according to claim 1, wherein the wheel light device is provided with a noise response switch and a sensor.

8. The wheel light device according to claim 1, wherein the wheel light device is provided with an adjustable timer and delay cut-off switch.

9. The wheel light device according to claim 1, wherein the wheel light device is provided with a dimmer switch.

10. The wheel light device according to claim 1, wherein the wheel light device is provided with a strobe light sensor and a switch.

11. The wheel light device according to claim 1, wherein, laser sensors are provided to detect a vehicle's tire within a specified distance from the wheel light device.

12. The wheel light device according to claim 11, wherein laser sensors are provided to detect one of the vehicle's wheels within 16 inches of the wheel light device.

13. The wheel light device according to claim 1, further comprising wheel light devices on both the right and the left sides of the vehicle, and including yellow LEDs located on each side of the vehicle, which are activated by a respective right or left turn signal.

14. The wheel light device according to claim 13, further including white LEDs located in the wheel light device and which are activated by a vehicle's parking lights.

15. The wheel light device according to claim 13, further including red LEDs located in the wheel light device and which are activated by a vehicle's brake lights.

* * * * *